United States Patent [19]

Thompson

[11] Patent Number: 4,506,705
[45] Date of Patent: Mar. 26, 1985

[54] PIPE CLOSURE DEVICE

[76] Inventor: Ernest R. Thompson, Rte. 1, Box 73, Farlington, Kans. 66734

[21] Appl. No.: 341,800

[22] Filed: Jan. 22, 1982

[51] Int. Cl.³ .............................................. F16L 55/12
[52] U.S. Cl. .................................................... 138/89
[58] Field of Search .......................... 138/89; 215/360; 285/245; 411/411; 220/235

[56] References Cited

U.S. PATENT DOCUMENTS

| | | | |
|---|---|---|---|
| 2,092,182 | 9/1937 | Ray | 220/238 |
| 2,355,492 | 8/1944 | White | 215/360 |
| 2,493,452 | 1/1950 | Grigg | 285/189 |
| 2,652,943 | 9/1953 | Williams | 220/3 |
| 2,661,860 | 12/1953 | Albert | 220/235 |
| 2,685,380 | 8/1954 | Moeller | 215/359 |
| 2,735,566 | 2/1956 | Bramming | 222/552 |
| 2,773,619 | 12/1956 | Moeller | 220/237 |
| 2,800,242 | 7/1957 | Sauthoff | 220/3.8 |
| 3,054,427 | 9/1962 | Bonnette | 138/90 |
| 3,307,732 | 3/1967 | Roberts, Sr. et al. | 220/233 |
| 3,412,759 | 11/1968 | Potter et al. | 138/89 |
| 3,447,712 | 6/1969 | Galasso et al. | 220/251 |
| 3,451,583 | 6/1969 | Lee | 220/233 |
| 3,471,179 | 10/1969 | Sixt | 285/176 |
| 3,494,504 | 2/1970 | Jackson | 220/237 |
| 3,525,365 | 8/1970 | Meulendyk | 138/89 |
| 3,574,312 | 4/1971 | Miller | 138/96 R |
| 3,993,102 | 11/1976 | Polster et al. | 138/89 |
| 4,113,006 | 9/1978 | Clapp | 165/76 |

FOREIGN PATENT DOCUMENTS 225564  6/1962  Austria .
545645  3/1932  Fed. Rep. of Germany .

OTHER PUBLICATIONS

*World Screw-Thread Forms,* American Machinist, Reference Book Sheet, 1961, p. 93.
Photographs and Promotional Materials for Stopper Manufactured by American Products Company.

Primary Examiner—Stephen Marcus
Assistant Examiner—Mark Thronson
Attorney, Agent, or Firm—Litman, Day & McMahon

[57] ABSTRACT

A closure device for an opening in a pipe and the like is provided which includes an elastomeric sealing ring having a threaded bore which tapers from an outer to an inner end of the sealing ring. A threaded plug having a tapered configuration from an outer to an inner end thereof is threadably receivable in the sealing ring whereby the sealing ring is expanded and engages the opening in sealing relation. The plug includes a multi-sided boss fixedly attached to and extending from its outer end. The sealing ring engages the opening when the plug is received in the bore thereof in a frictional engagement whereby the sealing ring resists rotation and axial sliding within the opening as the plug is axially advanced into the bore.

5 Claims, 4 Drawing Figures

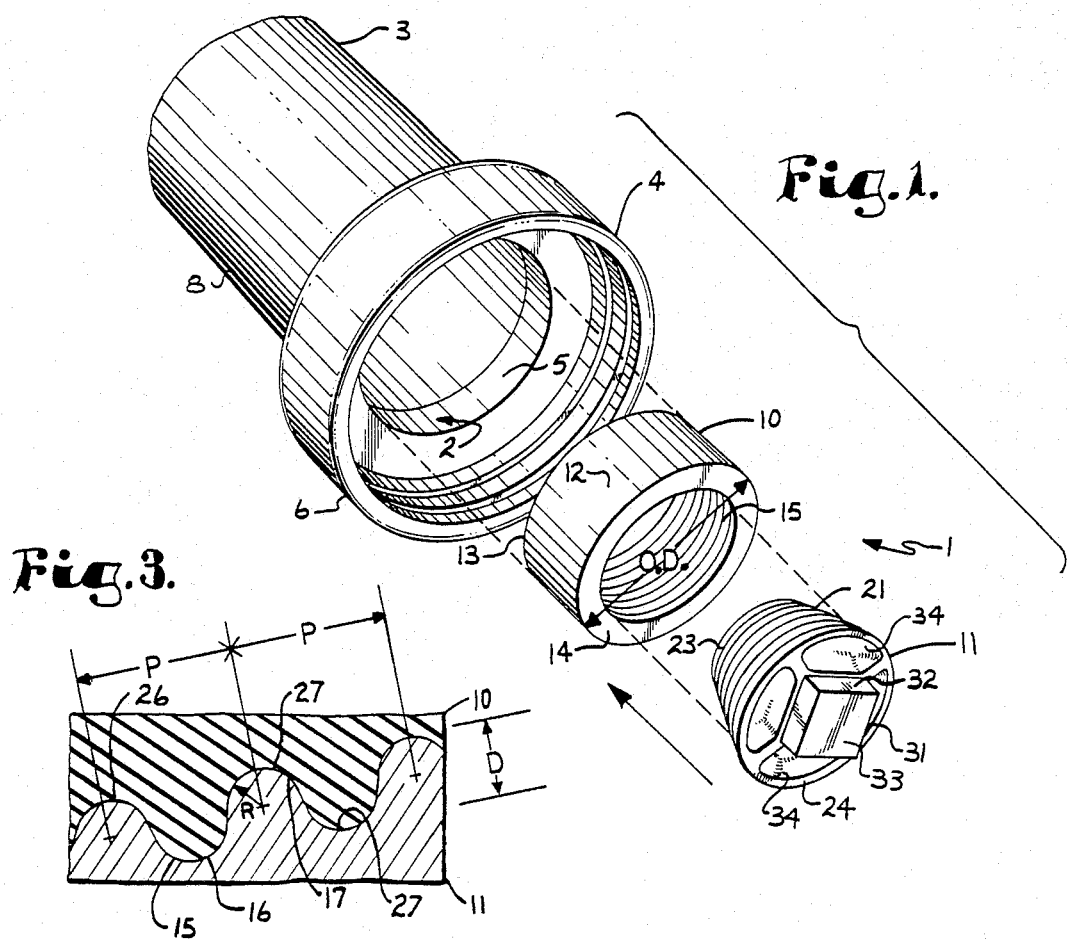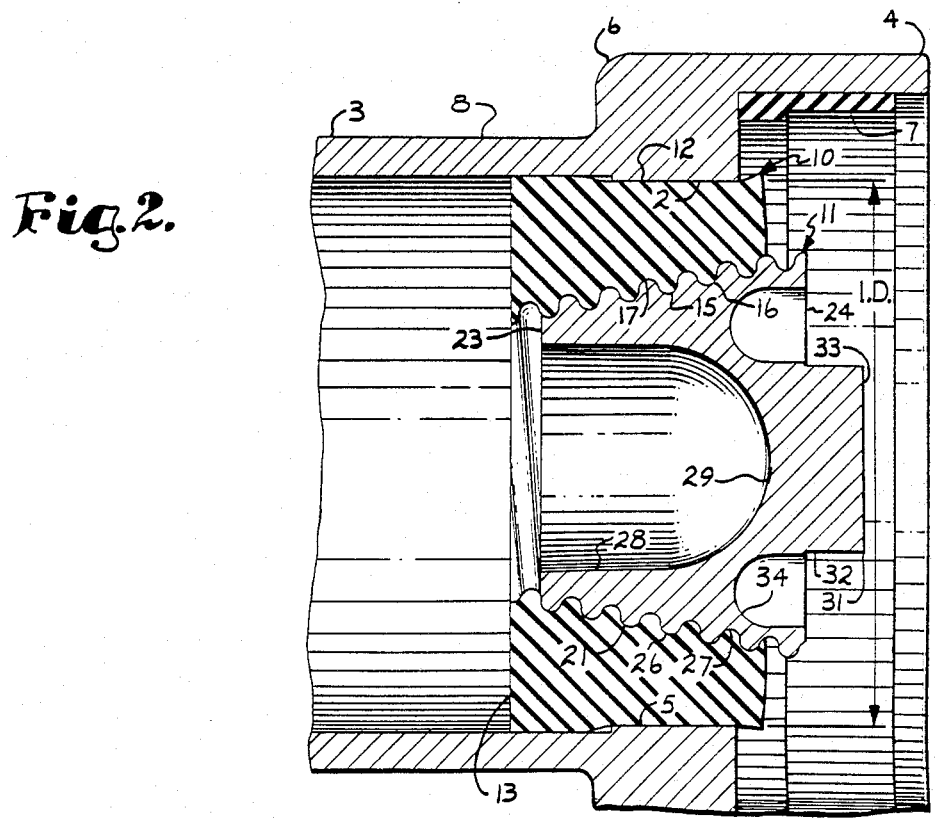

PIPE CLOSURE DEVICE

BACKGROUND OF THE INVENTION

1. Field of the Invention

This invention relates to closure devices for pipes, and in particular to an expandable closure device adapted for placement in a pipe opening in sealing relation.

2. Description of the Prior Art

Closure devices or plugs are used in a wide variety of applications for closing openings in pipes and the like. Exemplary uses in the plumbing field include closing and sealing the open ends of sewer, drain waste and vent pipes. It is frequently desirable that such closure devices or plugs be removable and reusable. For example, in the construction of sewer lines, sewer mains are typically installed sometime prior to the connection of lateral sewer lines to individual structures. Connections which are not needed are typically plugged with removable closure devices until laterals are run therefrom to new structures. However, before being placed in service, all of the connections must be plugged to allow the connected laterals and the rest of the sewer system to properly function. Also, the entire sewer system must be closed so that it may be pressure tested for leaks. Such closure devices must therefore be capable of withstanding the pressures associated with normal operation of the rest of the sewer system and with an air or water pressure test. For example, water test pressures of approximately 4.3 psi (about 10 feet of water head) are commonly specified for these types of systems.

Removable pipe closure devices are also extensively used as "clean out" plugs. These are normally provided at pedetermined locations in waste and drain piping systems for providing access thereto. Such clean out plugs are removed to dislodge and extract blockages from the system.

A variety of closure devices and plugs have previously been designed in an attempt to achieve a plug which is relatively inexpensive, easy to install and remove, and capable of withstanding relatively high pressures. For example, it is well known to provide a coupling having female threads on the end of a pipe and to threadably insert a plug having male threads to close the pipe. A seal may be effected in such devices by either tapering the threaded portions of the coupling and the plug (e.g. using standard NPT tapered threads) or by using an elastomeric gasket which seats between the plug and the coupling. However, this method is not practiced on pipes comprising certain materials, for example, clay.

Plastic pipes comprising, for example, acrylonitrile-butadiene-styrene (ABS) and polyvinyl chloride (PVC) may be closed by solvent welding a plug on their open ends. However, the end of the pipe must be cut off to open it, thus making this method undesirable for clean outs. Plastic ABS and PVC fittings having tabs extending from the sockets or hubs for receiving clean out plugs are also known. In such systems, inclined slots on the clean out plug receive the tabs whereby a seal is effected when the plug is twisted. A disadvantage with this system is that both elements, that is the fitting and the plug, must match.

A major drawback to the use of all of the aforementioned systems relates to their lack of uniformity and interchangeability. Thus, plumbers and their suppliers must stock pipe stopper parts of not only different sizes, but also of different types. Therefore, removable plugs have been devised which are capable of effecting a frictional sealing engagement with the bore of a "plain end" pipe having a smooth surface. For example, the Roberts et al U.S. Pat. No. 3,307,732 discloses a plug having a tapered surface for tightly compressing a sealing ring into engagement with the inside of a pipe as the plug is pulled outwardly by the installer or forced outwardly by internal pressure. However, the sealing ring forms a relatively narrow seal for closing the pipe, and special tools are required for removing the device.

The Jackson U.S. Pat. No. 3,494,504 also shows a device for forcing a sealing ring into engagement with the inside of a pipe. However, that device has several interconnecting parts requiring manufacture to relatively exact tolerances and thus necessitates a relatively high cost. A further type of closure device for a plumbing clean out fitting is disclosed in the Polster et al U.S. Pat. No. 3,993,102 wherein a male threaded plug compresses a gasket into engagement with a body having a female threaded portion. However, the body is placed on the outside of a pipe end and requires caulking to form a tight seal with respect thereto, and is thus not particularly suitable for removal and reuse. Therefore prior art fittings and plugs have tended to be complex, not interchangeable or not well adapted for easy installation, removal and reuse.

In the practice of the present invention, a sealing ring is provided having a tapered bore therethrough with rounded threads. A tapered plug having corresponding rounded threads is threadably engageable in the sealing ring bore. The sealing ring is placed in an opening in a pipe and the like and expands into sealing engagement therewith as the plug is axially advanced into the sealing ring bore. The rounded threads of the sealing ring bore and the plug function to prevent the plug, which generally comprises a harder material than the sealing ring, from cutting into the elastomeric sealing ring. A multi-sided boss is integrally attached to an outer end of the plug whereby the plug may be installed or removed with a wrench.

A peripheral surface of the sealing ring frictionally engages an inside surface of the pipe opening whereby relative rotation and axial sliding therebetween is prevented as the plug is inserted or withdrawn.

The principal objects of the present invention are: to provide a closure device for openings in pipes and the like comprising a variety of materials; to provide such a closure device for female pipe ends having bells, sockets or hubs and plain male pipe ends; to provide such a closure device which may be positioned inside either the bore or hub of a female pipe end; to provide such a closure device which is easily installed and removed; to provide such a closure device which is reusable; to provide such a closure device which provides a relatively large area of sealing contact with the inside surface of a pipe; to provide such a closure device which forms a sealing engagement with either a smooth or threaded inside surface of a pipe; to provide such a closure device with a sealing ring peripheral surface which frictionally engages a pipe opening inside surface and thereby prevents relative rotation or axial sliding therebetween as the plug is inserted or withdrawn; to provide such a closure device with corresponding rounded threads on a sealing ring bore and a plug; to provide such a closure device which may be installed and removed with a common hand tool; to provide such a closure device capable of withstanding relatively high pressures; and to provide such a closure device which is economical to manufacture, efficient in use, capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an exploded perspective view of a closure device embodying the present invention, shown in position for insertion into a pipe end opening.

FIG. 2 is an enlarged, cross-sectional view of the closure device shown positioned in the pipe end opening.

FIG. 3 is an enlarged, fragmentary, cross-sectional view of the closure device particularly showing the configuraton of the plug and sealing ring bore threads.

DESCRIPTION OF THE PREFERRED EMBODIMENTS

Figure 4:
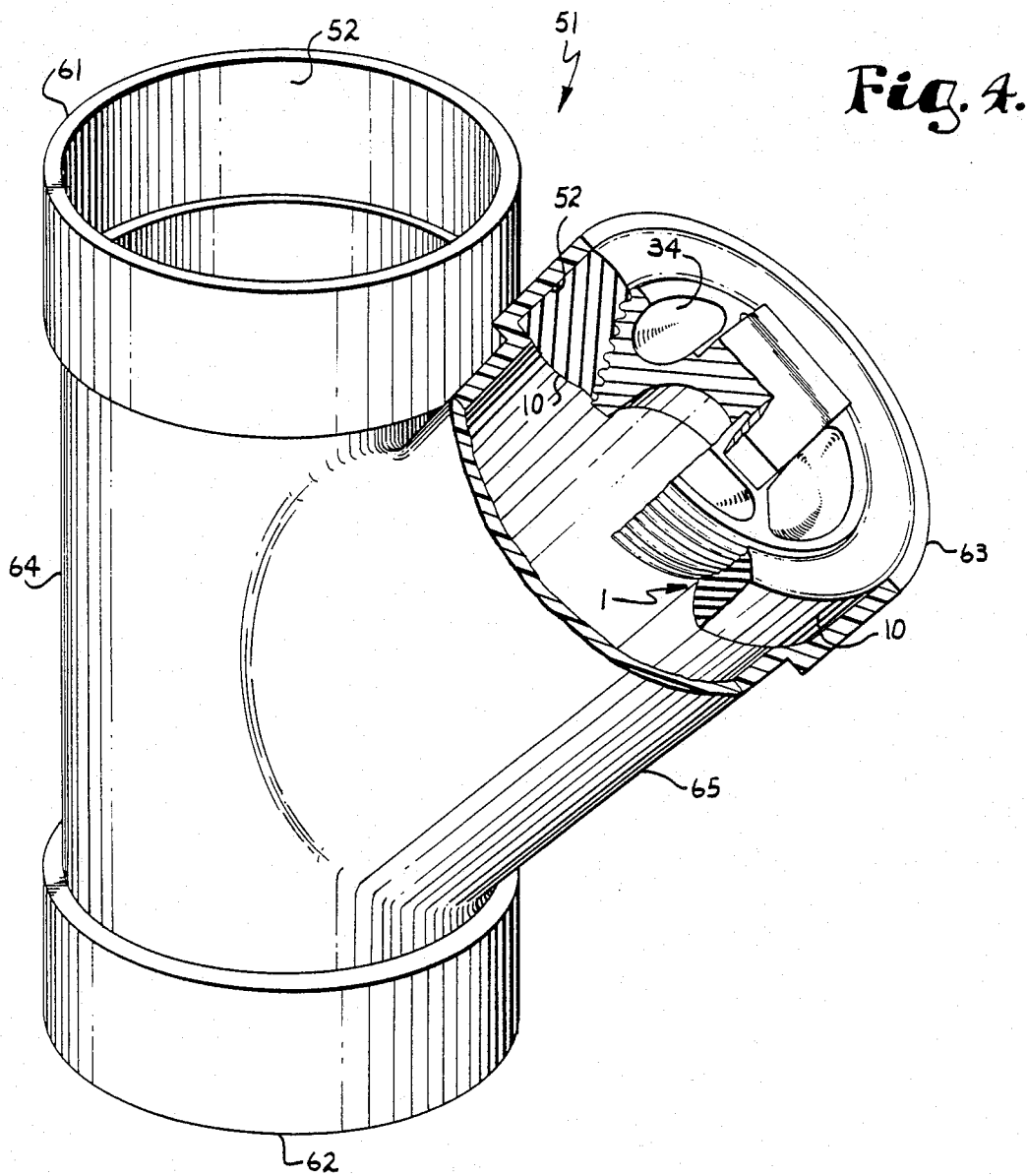
FIG. 4 is a perspective view of a plastic pipe fitting having the closure device applied thereto and with portions broken away.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

For purposes of description herein, the terms "inner" and "outer" shall relate to the directions to the left and right respectively of the invention as oriented in FIG. 2. However, it is to be understood that the invention may assume various alternative orientations, except where expressly specified to the contrary.

Referring to the drawings in more detail, the reference numeral 1 generally designates a closure device for an opening 2 in a clay pipe 3 of the type commonly used for sewer laterals. A female end 4 of the pipe 3 is shown (FIGS. 1 and 2) and has a bell or hub 6 which is adapted to receive the male plain end of another pipe (not shown) in coupling engagement. The pipe 3 includes a barrel 8 and terminates in a male plain end (not shown). The pipe opening 2 thus has a narrower inside diameter (ID) at an inside surface 5 of the pipe barrel 8 than at the bell 6.

The closure device 1 generally comprises two parts, a sealing ring 10 and a plug 11. The sealing ring 10 has a generally cylindrical configuration with a peripheral surface 12 extending between inner and outer ends 13 and 14 respectively. The outside diameter (OD) of the sealing ring 10 is approximately 0.100 inches less than the ID of the pipe opening 2 at the barrel 8.

A bore 15 extends coaxially through the sealing ring 10 between its inner and outer ends 13 and 14 respectively. As shown in FIG. 2, the bore 15 has a tapered configuration and converges from its outer end 14 to its inner end 13. The threaded bore 15 displays a plurality of alternating lands and grooves 16 and 17 respectively when viewed in longitudinal cross-section (FIG. 2). As shown, the lands and grooves 16 and 17 respectively are rounded, and of a type generally designated as a modified British rounded thread. The cross-sectional proportions of the respective lands and grooves 16 and 17 are shown in detail in FIG. 3, and are represented by the formula $d = P/2$; wherein d equals the depth of the grooves 17 and P equals the spacing of the lands 16.

The sealing ring 10 comprises an elastomeric material having a durometer in the range of approximately 40 to 65. Without limitation on the generality of useful materials, the sealing ring 10 may comprise, for example, rubber, thermoplastic rubber or polyurethane.

The plug 11 includes a male threaded outer surface 21 generally defining a right frustum of a cone. The plug outer surface 21 tapers from its widest diameter at a plug outer end 24 to its narrowest diameter at a plug inner end 23. A plurality of alternating lands and grooves 26 and 27 respectively are displayed by the plug outer surface 21 when viewed in longitudinal cross-section, as in FIG. 2. The male threaded plug outer surface 21 corresponds to the female threaded sealing ring bore 15. The lands and grooves 26 and 27 respectively are proportioned as shown in the thread detail, FIG. 3, and as represented by the formula $d = P/2$ wherein d equals the depth of the grooves 27 and P equals the spacing of the lands 26.

An opening 28 extends from the plug inner end 23 into the plug 11 and terminates at a rounded end 29. A boss 31 having four sides 32 and an outer face 33 extends outwardly from the plug outer end 24 and is integrally formed with the plug 11. Although threadably inserting the plug 11 into the sealing ring bore 15 generally presents no problem, the plug peripheral surface 21 may be wrapped with anti-friction tape to facilitate its insertion and removal. The plug 11 comprises a substantially rigid material such as, without limitation on the generality of useful materials, acrylonitrile-butadiene-styrene (ABS) resin, polyvinyl chloride (PVC) polyphenylene oxide (PPO), polyethylene (PE) or metal.

A plurality of recesses 34 extend inwardly from the plug outer end 24 adjacent and radially positioned around the boss 31. The recesses 34 function to reduce the mass of the plug 11 at their respective locations and minimize warping and cracking as the material comprising the plug 11 cools after being cast or molded.

A method of using the closure device 1 is provided wherein the sealing ring 10 is inserted into the barrel 8 portion of the pipe opening 2, inner end 13 first. The sealing ring outer end 14 may extend slightly from the position where the pipe end 4 flares from its normal inside diameter (ID) to form the bell 6, as shown in FIG. 2. Because the outside diameter (OD) of the sealing ring 10 is slightly less than the inside diameter (ID) of the pipe opening 2, it is readily received therein. However, even if an imperfection or a protrusion is present either on the pipe opening inside surface 5 or on the sealing ring peripheral surface 12, the elastomeric properties of the sealing ring 10 will allow it to yield sufficiently to accommodate most imperfections or projections which would likely be encountered.

With the sealing ring 10 thus positioned, the plug inner end 23 is inserted into the sealing ring bore 15 and the plug 11 is inwardly axially advanced into the bore 15 by turning the plug 11 whereby its peripheral surface 21 threadably engages the sealing ring bore 15. As the plug 11 advances axially inwardly, an interfering threaded engagement is effected because of the respective tapers of the plug 11 and the bore 15. The elastomeric sealing ring 10 thus swells to accommodate the plug 11, and its peripheral surface 12 is urged against the pipe opening inside surface 5 whereby a frictional engagement is established therebetween. The pipe opening 2 is thus substantially closed to fluid passage therethrough.

The frictional engagement between the pipe opening inside surface 5 and the sealing ring peripheral surface 12 functions to resist rotation and axial sliding movement of the sealing ring 10 relative to the pipe opening 2 as the plug 11 is rotated and thus inwardly axially advanced. It has been found that the counter-rotative torque exerted by the frictional engagement between the pipe opening inside surface 5 and the sealing ring peripheral surface 12 is generally greater than the torque imparted by turning the plug 11 within the sealing ring bore 15. The elastomeric sealing ring 10 is thus maintained in a fixed position relative to the pipe opening 2 while the plug 11 axially either advances or withdraws from the bore 15.

The corresponding modified British rounded thread configurations of the sealing ring bore 15 and the plug peripheral surface 21 prevent the elastomeric material of the sealing ring 10 from being cut by the harder material of the plug 11. A relatively tight interference engagement may thereby be formed between the sealing ring 10 and the plug 11 without cutting or otherwise damaging the sealing ring 10.

The rounded thread designs of the sealing ring bore 15 and the plug peripheral surface 21 similarly facilitate removal of the plug 11. Because the sealing ring 10 is generally not damaged by either insertion or removal of the plug 11, the closure device 1 is reusable. When the closure device 1 is to be removed from the pipe opening 2, the anti-rotative torque forces formed by the frictional engagement between the sealing ring peripheral surface 12 and the pipe opening inside surface 5 similarly exceed the rotative torque forces caused by turning the plug 11, whereby the sealing ring 10 generally does not rotate or axially slide with respect to the pipe 3 during such a plug removal operation. Even with the plug 11 removed, the sealing ring 10 will generally remain in place, and may be easily withdrawn from the pipe opening 2 by hand. The sealing ring 10 and the plug 11 respectively of the closure device 1 are thus unlikely to be dropped into a pipe opening 3 to become lost or difficult to retrieve.

The closure device 1 may also be employed with pipe openings which are somewhat either undersized or oversized for the sealing ring 10. In an undersized opening, the sealing ring 10 is somewhat compressed and inserted therein without the plug 11. The plug 11 is then screwed only part way into the sealing ring bore 15, as this is generally sufficient to effect a tight sealing engagement. For an oversized opening, the plug 11 is screwed into the sealing ring 10 to expand it before insertion into the opening. The respective tapers of the plug peripheral surface 21 and the sealing ring bore 15 in combination with the elasticity of the sealing ring 10 allow for considerable expansion or compression of the sealing 10 to accommodate a range of different sized pipe openings. The sealing engagement formed by the closure device 1 with respect to the pipe opening 2 will thereby be capable of resisting relatively high pressures within the pipe 3 in comparison to other friction-type closure devices and plugs.

To prevent sticking between the sealing ring 10 and the pipe opening 2, the sealing ring peripheral surface 12 or the pipe opening 2 may be coated with, for example, petroleum jelly. Such sticking is most often encountered when the pipe 3 comprises clay and the sealing ring 10 is left in place for a considerable period of time.

In closing a female pipe end such as that shown at 4 comprising clay, it is generally preferable to position the sealing ring within the opening or barrel 2 thereof rather than in the bell or hub 6, because the pipe 3 is considerably stronger at the former. Therefore, although the bell or hub 6 may receive the sealing ring 10, the pipe 3 is less likely to crack if the sealing ring 10 is placed in the opening or barrel 2 thereof.

FIG. 4 shows the sealing ring 10 placed in the opening 52 of a plastic PVC or ABS pipe fitting 51. The pipe fitting 51 includes upper, lower and side sockets or hubs 61, 62 and 63 respectively. Connecting the upper and lower sockets 61 and 62 is a main barrel 64. A side barrel 65 communicates the side socket 63 with the main barrel 64. The sockets 61, 62 and 63 are each adapted to receive the male plain end of respective plastic PVC or ABS pipes (not shown). The fitting 51 is of the type commonly used in plastic waste and drain piping, for example, as a three-way connection and as a clean-out fitting.

The closure device 1 of the present invention may be used to seal any of the sockets 61, 62, and 63, the main barrel 64 or the side barrel 65. Unlike the clay pipe 3, the plastic PVC or ABS fitting 51 is strong enough to receive the closure device 1 in its sockets or hubs 61, 62 and 63, which are also more convenient and accessible positions. However, a sealing ring 10 sized for the barrels 64 and 65 would have the advantage of also being usable with the plain male end of a corresponding pipe, eliminating the need for different sized closure devices 1 for male and female ends.

When positioned as shown on a fitting 51, the closure device 1 seals the side socket 63. The side socket 63 may provide, for example, a hook-up for additional plumbing to be installed subsequent to pipes being attached to the upper and lower sockets 61 and 62 respectively. Alternatively, the closure device 1 may be a removable clean-out plug to provide access to a pipe (not shown) attached to the lower socket 62. Thus, when the system does not drain properly, the closure device 1 may be removed and chemical or mechanical means inserted through the side socket 63 to clear the pipe. It will be appreciated that any combination of the sockets 61, 62 and 63 may receive either closure devices 1 or plain male pipe ends as required.

Although the closure device 1 is shown for closing a pipe 3 with a bell-type end 6, it is similarly adapted for use with plain-end pipes. Also, the closure device 1 may be employed with pipes comprising a plurality of materials such as clay, plastic or metal, and in pipe openings having internal threading, whether such threading be of the tapered type or the straight non-interfering type.

It is to be understood that while certain forms of this invention have been illustrated and described, it is not to be limited thereto except insofar as such limitations are included in the following claims.

What is claimed and desired to secure by Letters Patent is:

1. A closure device for an opening in a pipe and the like, which comprises:

(a) a flexible, elastomeric sealing ring having:
  (1) a peripheral surface;
  (2) an inner end;
  (3) an outer end;
  (4) a bore extending therethrough and opening onto said sealing ring inner and outer ends and tapering inwardly from said outer end; and
  (5) said bore having threading thereon;
(b) a rigid plug having:
  (1) an inner end;
  (2) an outer end;
  (3) a peripheral surface having a generally frusto-conical configuration tapering from said plug outer end to said plug inner end;
  (4) said plug peripheral surface having threading thereon; and
  (5) a multi-sided boss extending outwardly from said plug outer end;
(c) said plug being threadably received and inwardly axially advanced in said sealing ring bore whereby said sealing ring is expanded and its peripheral surface engages said opening in sealing relation;
(d) said sealing ring limiting insertion of said plug into said sealing ring bore whereby said plug outer end is positioned outwardly from said seal outer end with said closure device in sealing relation in said opening;
(e) said threads on said sealing ring bore and said plug peripheral surface having respective lands and grooves with corresponding cross-sectional configurations with continuous, curvilinear, arcuate alternating convex and concave configurations at said lands and grooves without flat areas between said lands and grooves;
(f) said cross-sectional configurations of said threads on said sealing ring bore and said plug peripheral surface having groove depths from tops of said lands to respective bottoms of said grooves and said threads having thread pitches comprising the respective spacings therebetween, said cross-sectional configurations of said threads being substantially represented by the formula:

$$d = P/2$$

wherein d represents the depths of said grooves and P represents the pitches of said threads;
(g) said sealing ring and plug threads extending substantially perpendicularly from said sealing ring bore and said plug peripheral surface respectively; and
(h) said respective lands and grooves on said sealing ring threaded bore and said plug peripheral surface forming substantially continuous contact areas therebetween when said closure device is subjected to a pressure from within said pipe and the like whereby said sealing ring is deformed outwardly, said respective lands and grooves being adapted to shift relative to each other and maintain said continuous contact areas and a fluid seal therebetween.

2. The pipe closure device according to claim 1, which includes:
  (a) said boss being square and having a square, outer face positioned outwardly from and substantially parallel to said plug outer end.

3. The pipe closure device according to claim 1, which includes:
  (a) a plurality of recesses extending into said plug from its outer end and radially positioned around said boss.

4. The pipe closure device according to claim 3, which includes:
  (a) a plurality of solid portions extending radially outwardly from the boss toward said plug peripheral surface, said solid portions being positioned at said plug outer end and between said recesses.

5. The pipe closure device according to claim 1, which includes:
  (a) an opening extending coaxially from said plug inner end and terminating at a blind end.

* * * * *